United States Patent [19]

Rupert et al.

[11] 4,126,658

[45] Nov. 21, 1978

[54] METHOD OF BLOW MOLDING

[75] Inventors: Samuel J. Rupert; William E. Ziegler, both of Ann Arbor, Mich.

[73] Assignee: Hoover Ball and Bearing Company, Saline, Mich.

[21] Appl. No.: 846,431

[22] Filed: Oct. 28, 1977

Related U.S. Application Data

[63] Continuation-in-part of Ser. No. 681,708, Apr. 29, 1976, abandoned.

[51] Int. Cl.² .................. B29C 17/07; B29C 17/10
[52] U.S. Cl. .............................. 264/89; 264/98; 425/527; 425/530; 425/531; 425/532; 425/534
[58] Field of Search ............... 264/89, 94, 98, 99; 425/525, 527, 530, 531, 532, 534

[56] References Cited

U.S. PATENT DOCUMENTS

| | | | |
|---|---|---|---|
| 2,128,239 | 8/1938 | Ferngren | 264/98 |
| 3,272,896 | 9/1966 | Winchester, Jr. | 264/98 |
| 3,325,862 | 6/1967 | Mehnert | 264/98 X |
| 3,329,996 | 7/1967 | Marcus et al. | 264/98 X |
| 3,410,937 | 11/1968 | Winchester, Jr. | 264/98 |
| 3,531,556 | 9/1970 | Mehnert | 264/98 |
| 3,548,044 | 12/1970 | Gallay | 264/98 X |
| 3,752,627 | 8/1973 | Bourgeois et al. | 425/298 |
| 4,007,243 | 2/1977 | Rupert | 264/98 X |

FOREIGN PATENT DOCUMENTS 1,479,218  5/1969  Fed. Rep. of Germany ............ 264/94

*Primary Examiner*—Jan H. Silbaugh
*Attorney, Agent, or Firm*—Olsen and Stephenson

[57] ABSTRACT

An improved method of blow molding bottles of thermoplastic material wherein intermittent extrusion apparatus is employed to produce bottles with finished necks free of external blemishes, the method including the steps of intermittently extruding tubular parisons from an annular orifice, enclosing the first tubular parison in a mold that has an interior cavity that defines the bottle and also defines a dome radiating outward from the upper end of the bottle neck, immediately blowing the parison essentially to the shape of the cavity, but as an incident to the blowing of the parison and to the interruption of the extrusion, causing the thermoplastic material to be severed at the extrusion orifice, and immediately shifting the mold enclosed article to a shaping station while the article is still at a temperature sufficient for subsequent shaping operations, and at the shaping station finish blowing the article while trimming and at least partially compression-molding the neck.

10 Claims, 7 Drawing Figures

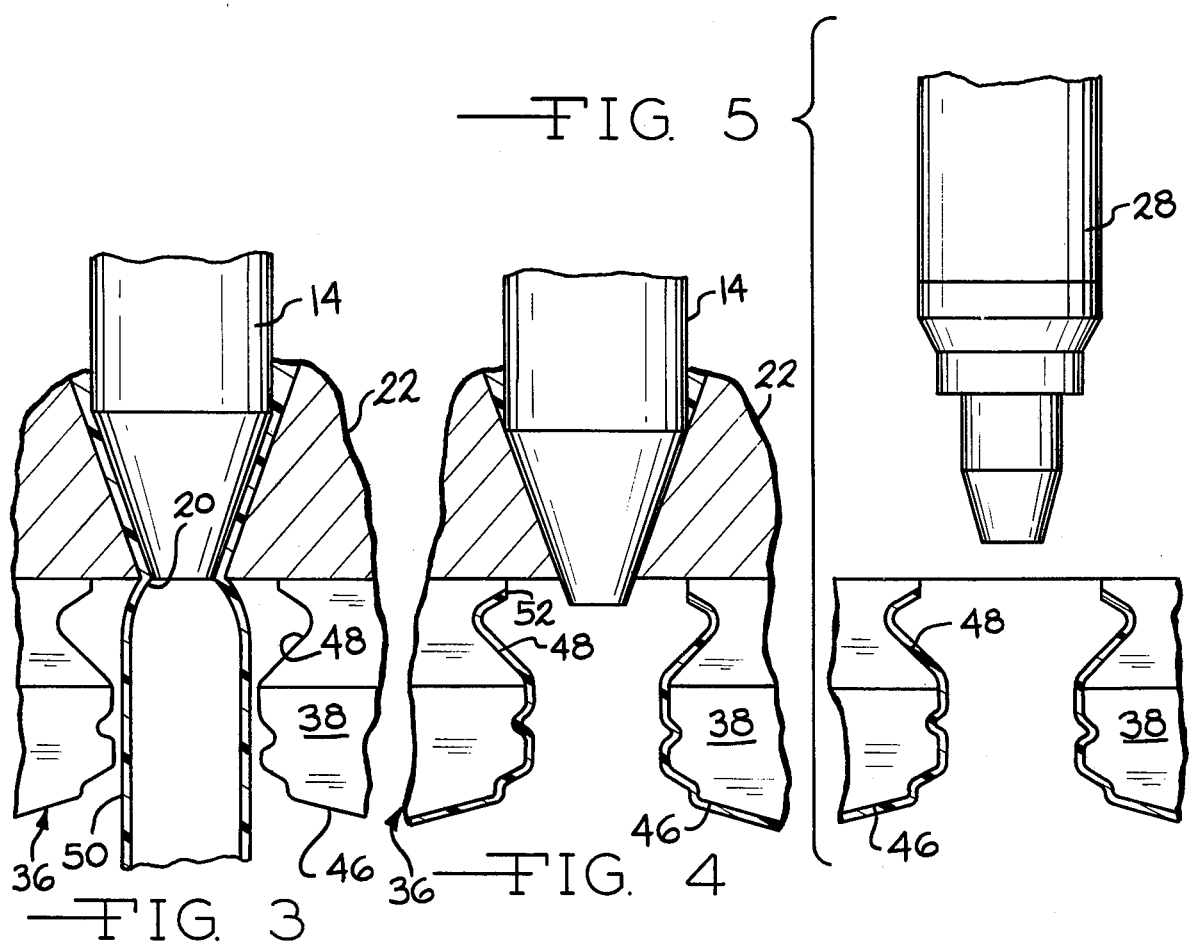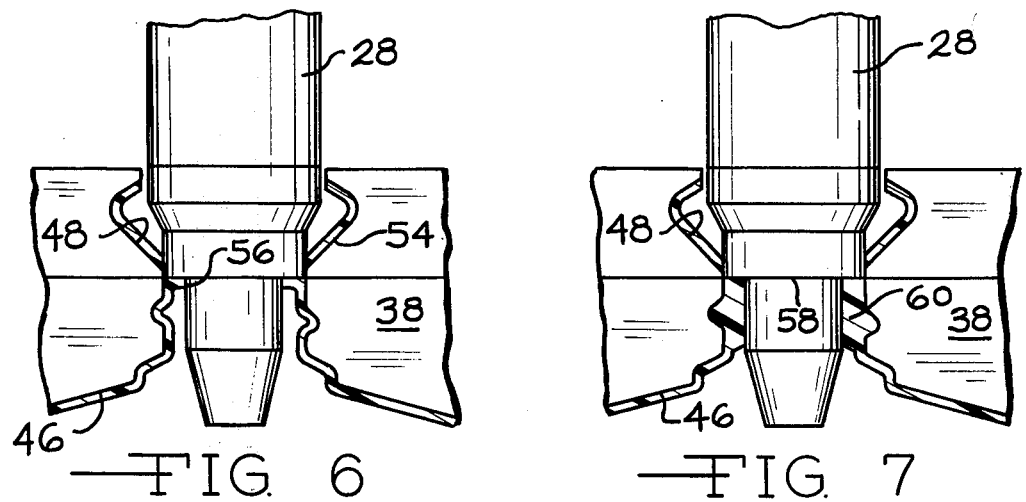

METHOD OF BLOW MOLDING

REFERENCE TO RELATED APPLICATION

This application is a continuation-in-part to pending application, Ser. No. 681,708, filed Apr. 29, 1976 now abandoned.

BACKGROUND OF THE INVENTION

The present invention relates to an improved method of blowing bottles with finished necks wherein intermittent extrusion blow molding apparatus is employed.

It is conventional practice to utilize apparatus of this character to form bottles with necks that are trimmed and compression molded at the extrusion station, as is disclosed, for example, in U.S. Pat. No. 3,470,582, issued Oct. 7, 1969 to Martin, Jr., entitled "Apparatus for Compacting and Trimming Necks in Blow Molded Containers". As is disclosed in this patent, when forming bottles with a small neck, it is inherent with the apparatus used that the extruded parison will have a diameter greater than the neck of the blown bottle so that when the mold halves are closed on the parison, flash is formed on opposite sides of the neck and shoulders of the bottle and must subsequently be trimmed from the bottle, leaving blemishes or flash marks. These marks are undesirable in bottles used in certain industries, such as the cosmetics industry, so that when supplying these industries with bottles, other blow molding practices must be followed which produce bottles which are free from flash marks on the exterior surfaces and particularly on the neck. Not only is this requirement made for reasons of appearance, but also to assure that optimum sealing conditions exist between the threaded neck of the bottle and the closure cap.

Various procedures and apparatus are known in the blow molding industry for forming bottles which meet requirements relating to appearance, but these procedures are not fully adequate to meet the demands of industry for bottles that have the desired finsihed neck, and that also have a desired neck wall thickness for allowing a fill tube to enter the bottle and function properly, and that can be produced at a minimum cycle time so as to provide bottles of the desired quality at a minimum of cost.

SUMMARY OF THE INVENTION

The present invention has overcome the inadequacies of the prior art and provides an improved method of blow molding a thermoplastic bottle of the foregoing character. The improved method is practiced by utilizing intermittent extrusion whereby a parison can be extruded rapidly and the mold halves can then be closed quickly on the parison and immediately transferred laterally to a finishing station. The lateral movement of the closed mold occurs with the upper surface of the mold traveling exclusively in a horizontal plane in essentially the horizontal plane containing the lower surface of the extrusion head, and in the preferred mode of operation, the upper surface of the mold is in sliding engagement with the lower surface of the extrusion head. The parison is severed at the extrusion orifice by the combination of an initial blowing of the parison and an interruption of the extrusion of the plastics material which occurs substantially at the same instance that the mold is closed. The mold has a dome shaped cavity portion above the neck of the portion of the cavity defining the bottle, and the severed end of the parison is flared outwardly in the dome portion and is parted from the extrusion orifice as an incident to the initial blowing and extrusion-interruption steps. Because of the location of the lower surface of the extrusion head over the cavity portion, an essentially closed chamber is provided for outwardly flaring the severed end of the parison.

Without holding the blow-pressure on the blown article so as to allow the plastics material to cool and set, the closed mold is transferred immediately, and with its upper surface exclusively in the horizontal plane, to a second station where a second mandrel enters the mold cavity to finish the neck of the bottle, trimming off the flash from above the neck and simultaneously a finish-blow is provided for a time sufficient to allow the plastics material of the finished bottle to set. The mold halves are opened to discharge the bottle and then returned to the extrusion station where a next succeeding parison can be extruded rapidly and the cycle can be repeated.

In the described cycle of operation the dome portion of the mold serves to aid in holding the initially blown article in place during the transfer to the finishing station while the plastics material is still at a relatively high temperature and before it has set. In addition it also serves as a small reservoir for plastics material that can be compression molded into the neck of the bottle, to the extent desired. The amount of the plastics material in the dome portion for this purpose can be controlled by programmed extruding and by the configuration selected for the dome portion of the mold.

By virtue of the intermittent extrusion step that is employed, a plurality of extrusion heads from a common extruder can be employed, together with one pair of mold halves having a plurality of cavities defining bottles. Finishing stations can be located between the extrusion heads so that a plurality of bottles can be formed simultaneously and at rapid cycle times.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIGS. 3 and 4 are fragmentary sectional views showing schematically two successive steps of the method that are performed at the extrusion station;

FIGS. 5 and 6 are fragmentary sectional views showing schematically two successive steps of operation that are performed at the finishing or final shaping station; and FIG. 7 is a fragmentary view similar to FIG. 6, but showing a bottle formed with greater compression molding of the neck.

DESCRIPTION OF THE PREFERRED EMBODIMENTS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
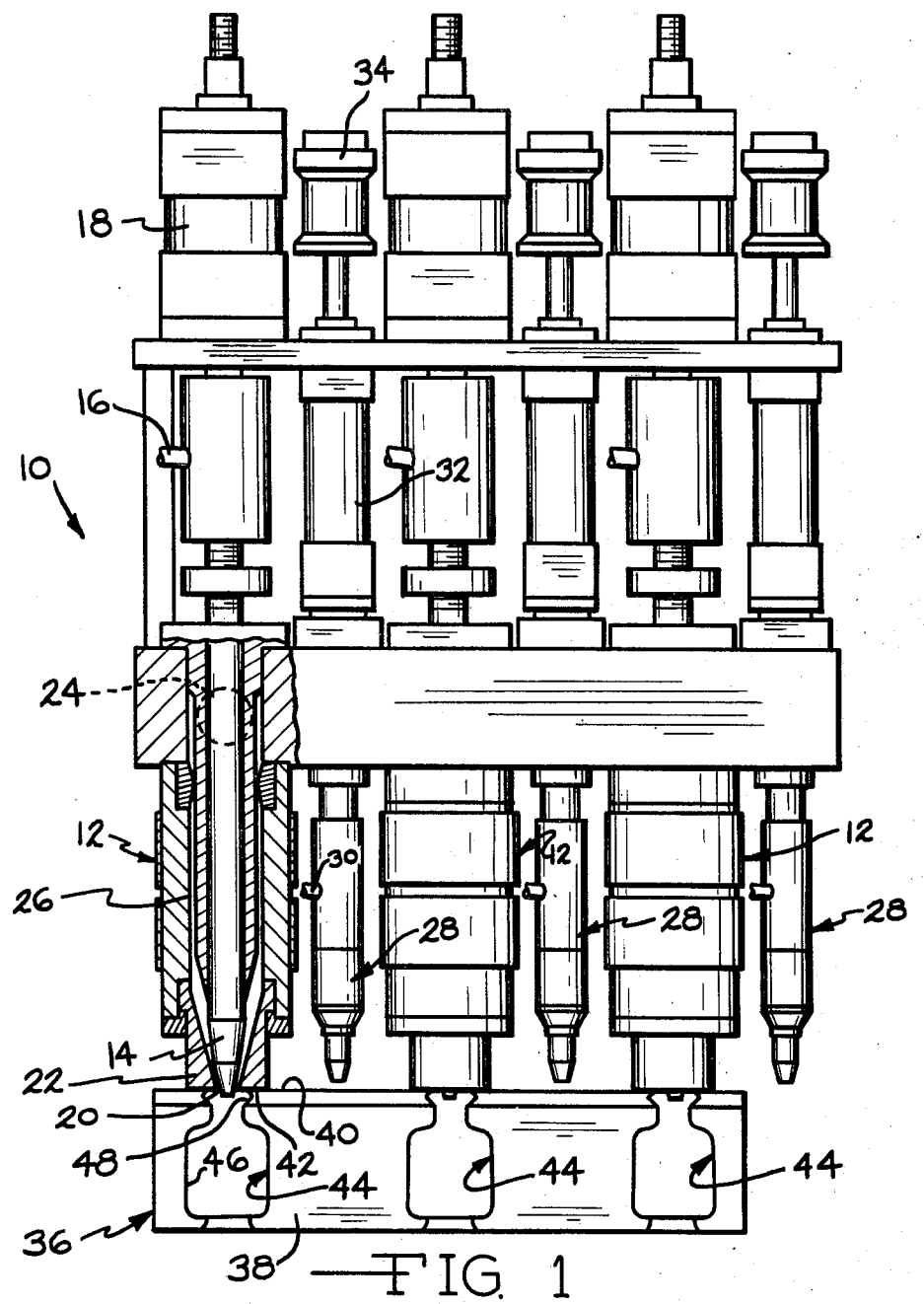
FIG. 1 is a front elevational view of extrusion and blow molding apparatus showing one-half of the mold at the extrusion station, with portions of the apparatus in section and other portions removed to facilitate the description of the method comprising the present invention.
Figure 2:
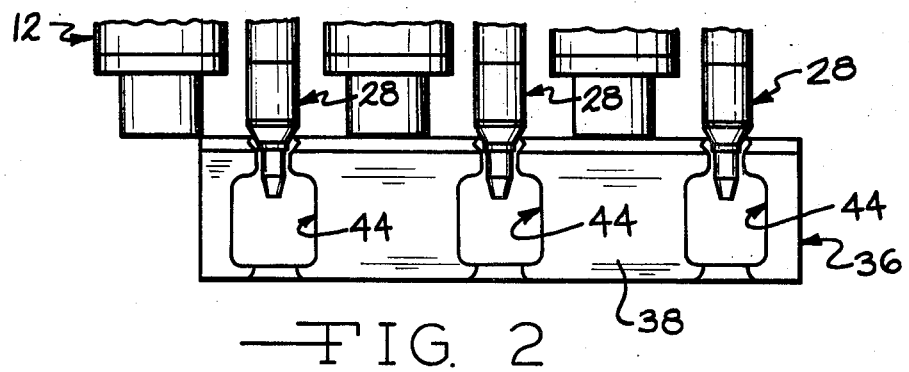
FIG. 2 is a fragmentary elevational view, similar to FIG. 1, but showing the one-half of the mold in its transferred position at the finishing or final shaping station.

Referring now to the drawings, the invention will be described in greater detail. Attention is directed first to FIGS. 1 and 2 for a description of one form of the apparatus that may be used to carry out the new method of blow molding thermoplastic articles. The blow molding apparatus 10 is provided with a plurality of extrusion heads 12 which are adapted to receive thermoplastic material from a reciprocating screw extruder of the type illustrated in the patent to Martin, Jr., U.S. Pat. No. 3,335,457, issued Aug. 15, 1967. Only one of the extrusion heads will be described because they all are constructed essentially the same. The invention can also be practiced with conventional intermittent-extrusion apparatus wherein an accumulator for the plastics material is utilized.

Referring to the extrusion head 12 shown at the left in FIG. 1, an air mandrel 14 is provided through which air can be delivered from the conduit 16. The mandrel 14 is beveled at its lower end and is adapted to be moved axially by means of the fluid cylinder 18 which is operated by programming apparatus, not shown, so that the wall thickness can be varied of the parison that is extruded from the annular orifice 20 defined by the end of the mandrel 14 and opening in the die 22.

The plastics material enters the extrusion head in the conventional manner through the aperture 24 and flows through the passageway 26 to the extrusion orifice 20. Flow of the plastics material can be interrupted completely by fully advancing the air mandrel 14 in a downward direction, and a parison having maximum wall thickness can be obtained by retracting the air mandrel 14 to a fully raised position. Apparatus of this character is known in the prior art, and further description is believed unnecessary.

Located to one side of each extrusion head 12 is a second air mandrel 28, each of which has an air inlet conduit 30 and a fluid-actuated cylinder 32 adapted for reciprocating the air mandrel 28 in response to conventional control apparatus, including the limit stop member 34 which actuates suitable control switches, not shown. Each of the air mandrels 28 is located laterally to one side of the associated extrusion head 12 a distance corresponding to one-half the distance between the axes of adjacent extrusion heads 12.

Positioned immediately below the extrusion heads 12 is a mold 36 which has a pair of mold halves 38, only one of which is shown. When the mold 36 is closed, the upper surface 40 of the mold is located in a horizontal plane immediately adjacent to a horizontal plane containing the lower surface 42 of the die 22 for purposes that will presently be described. The closed mold halves define cavities 44 including the bottle-defining portion 46 and the dome-defining portion 48. The dome portion 48 flares outwardly from the neck of the bottle portion 46 and terminates at the upper end at the upper surface 40.

The mold 36 can be closed and moved laterally from the position shown in FIG. 1 wherein each of the cavities 44 are located at the extrusion station directly under the extrusion orifice 20 to the position shown in FIG. 2. At that position each of the cavities 44 is located at the second shaping or blowing station directly under the air mandrel 28. The mold 36 can be opened at the position in FIG. 2 and can then be moved laterally back to the position in FIG. 1. As is apparent from these figures of the drawing, the movement of the upper surface 40 of the mold 36 remains in a horizontal plane throughout these lateral movements.

In carrying out the method, the mold 36 is initially open and is located in the position shown in FIG. 1 wherein the mold cavities are at the extrusion station. The parison 50 is then extruded as shown in FIG. 3. The mold halves are then closed, and substantially simultaneously with the closing of the mold halves, the air mandrel 14 is advanced vertically to the closed position shown in FIG. 4 and air under pressure is introduced into the mold cavity so as to blow the parison 50 substantially into the conformity with the cavity. When this step is performed, the parison will be severed at the orifice 20 and flared outwardly generally to the position shown at 52 as an incident to closing of orifice 20 and blowing of the parison. No severing tool is employed. If necessary to provide the desired severing action, the programming of the wall thickness of the extruded parison 50 can be varied so that it will be relatively thin at the orifice 20 immediately prior to closing of the mandrel 14 to the position shown in FIG. 4. It is important to maintain the parison at maximum temperature at the orifice 20 so that it will readily part and flare outwardly to the position of FIG. 4 when the parison is subjected to the blowing action of the air.

Substantially immediately upon blowing the plastic article to the configuration shown in FIG. 4, the air mandrel 14 is again raised vertically to the position shown in FIG. 3 to provide clearance for movement of the closed mold 36 laterally to a position shown in FIG. 5 wherein the mold cavities 44 are at the second or shaping station immediately under the air mandrels 28. During the time that the transferring of the mold 36 occurs, the reciprocating screw of the extruder, not shown, or the accumulation chamber for the plastics material, not shown, will be controlled so that plastics material will not be urged out of the orifice 20.

Immediately upon positioning of the mold cavities under the air mandrels 28 and while the plastics material is still relatively hot, the mandrels 28 will be advanced from the position shown in FIG. 5 to the position shown in FIG. 6 so that the flash 54 is trimmed from the top of the bottle now defined within the cavity 44, and simultaneously the inner diameter or finish of the bottle will be formed at 56. Air under pressure is also simultaneously introduced into the blown bottle to finish shaping the latter and to aid in cooling and setting the plastics material. The mold 36 can now be opened and the air from mandrel 26 can be used to blow the bottle off of the mandrel to a receiving chute. The open mold 36 is now returned laterally to the extrusion station, and the hot thermoplastic material is again rapidly discharged from the extrusion orifice 20. As soon as a plastic parison of sufficient length has been extruded, the extrusion is stopped and the mold halves 38 are closed, and the cycle is repeated.

The extent to which the neck of the bottle is compression molded can readily be controlled by varying the amount of plastics material in the portion of the parison that is blown into the dome 48. This can be accomplished in the conventional manner by programming the wall thickness of the parison. The amount of material available for compression molding of the neck can also be varied to some extent by the taper of the dome 48 whereby greater or lesser amounts of plastics material are introduced by shoulder 58 into the neck portion 60.

From the foregoing description it will be appreciated that a plurality of bottles can be blow molded simultaneously from one extruding machine, and all of the bottles can be formed free of flash marks on the shoulders and necks of the bottles. Furthermore, the cycle time can be maintained at a minimum so that bottles of high quality can be produced at relatively low cost.

It is claimed:

1. In a method of making a container of blow moldable thermoplastic material, the steps of extruding a tubular parison of a predetermined diameter from an annular orifice located essentially in a horizontal plane representing the bottom surface of an extrusion head, enclosing the tubular parison in a mold that has an upper end movable in said horizontal plane in slidable engagement with said extrusion head, said mold being positioned at said orifice and having an interior cavity defining said container with a neck at its upper end larger in diameter than said predetermined diameter, said cavity also defining a dome radiating outward from the upper end of the neck so as to provide a top opening greater in diameter than the outer diameter of said annular orifice, immediately upon closing the mold closing said orifice and blowing the tubular parison at said orifice essentially to the shape of the mold cavity so that the parison at the neck of the mold cavity will be enlarged to conform to the shape of said neck and so that as an incident to said blowing and said closing of the orifice severing of the parison from the thermoplastic material at said annular orifice occurs and the upper end of the parison is flared outwardly to the outwardly radiating portion of said dome, immediately thereafter shifting horizontally the mold that contains the enclosed article so that said upper end of the mold remains exclusively in said horizontal plane to a second shaping station while the article is still at a temperature sufficient for subsequent shaping stations, inserting a finish blow pin into said mold and the neck of the article and as an incident thereto calibrating the neck of the article and severing from the article the neck flash that was expanded into the dome, introducing air at a pressure into said article for a time sufficient to allow the article to set, opening the mold and discharging the article therefrom, opening said extrusion orifice and extruding a succeeding parison, and returning the mold to the extrusion station and repeating the cycle with respect to the succeeding parison.

2. In a method of making a container of blow moldable thermoplastic material, the steps of extruding a tubular parison of a predetermined diameter from an annular orifice located when open essentially in a horizontal plane representing the bottom surface of an extrusion head, enclosing the tubular parison in a mold that has an upper end movable in said horizontal plane in slidable engagement with said extrusion head, said mold being positioned at said orifice and having an interior cavity defining said container with a neck at its upper end larger in diameter than said predetermined diameter, said cavity also defining a dome radiating outward from the upper end of the neck so as to provide a top opening greater in diameter than the outer diameter of said annular orifice, immediately upon closing the mold closing said orifice and blowing the tubular parison at said orifice essentially to the shape of the mold cavity so that the parison at the neck of the mold cavity will be enlarged to conform to the shape of said neck and so that as an incident to said blowing and said closing of the orifice severing of the parison from the thermoplastic material at said annular orifice occurs and the upper end of the parison is flared outwardly against the outward radiating portion, and immediately thereafter opening said orifice and shifting the mold that contains the enclosed article so that said upper end of the mold remains in said horizontal plane during transit to a second shaping station while the article is still at a temperature sufficient for subsequent shaping operations, and at the second shaping station inserting a finish blow pin into said mold through the neck of the container and severing the dome from the container, and introducing air into the container for a time and at a pressure sufficient to allow the thermoplastic material to set.

3. In the method that is defined in claim 2, wherein the step of extruding the parison includes programming the wall thickness thereof so that the upper end of the extruded parison adjacent to the extrusion orifice has a minimum thickness.

4. In the method that is defined in claim 2, wherein the step of severing the dome from the container includes advancing a portion of the material of the dome into the neck of the container to compression mold the neck.

5. In the method that is defined in claim 2, wherein the steps of closing said orifice and blowing the tubular parison includes advancing vertically a beveled mandrel to close said orifice, and said step of opening said orifice includes retracting said mandrel prior to shifting the mold horizontally across said orifice.

6. In a method of blow molding a thermoplastic article having a neck from a blow moldable thermoplastic material, the steps of extruding a first tubular parison of said material from an extrusion orifice located in a stationary extrusion head at an extrusion station wherein the extrusion orifice is located in the bottom wall of the extrusion head, said bottom wall being in a horizontal plane, said tubular parison having a smaller diameter than the diameter of the neck of said article, closing on said first tubular parison a mold having a top wall in sliding engagement with said bottom wall and movable horizontally exclusively in said plane and having vertically arranged communicating cavities defining said article and a dome above the neck of said article, the upper extremity of said dome terminating at said top wall and having a greater diameter than the outer diameter of said orifice, interrupting the extrusion of the material and closing said extrusion orifice substantially simultaneously when the mold is closed and at the same time initiating the blowing of (1) a lower portion of said first tubular parison to conform it to the cavity of said article and (2) an upper portion of the parison to expand it into the cavity defining said dome so as to separate the upper end of the parison from said extrusion orifice, immediately thereafter opening said extrusion orifice for extruding a succeeding parison and shifting the closed mold exclusively horizontally in said plane to a second station before the extrusion of the succeeding parison begins, inserting a finish blow pin into said mold and the neck of the article and as an incident thereto calibrating the neck of the article and severing from the article the neck flash that was expanded into the dome, introducing air at a pressure into said article for a time sufficient to allow the article to set, opening the mold and discharging the article therefrom, and returning the mold to the extrusion station and repeating the cycle with respect to a succeeding parison.

7. In the method that is defined in claim 6, wherein the steps of extruding a second tubular parison and each succeeding parison thereafter are started while the mold is at said second station.

8. In the method that is defined in claim 6, wherein the wall thickness of said tubular parison is programmed so that the upper end thereof has minimum thickness adjacent to said extrusion orifice when the latter is closed so as to facilitate separation of the upper end from the extrusion head when the blowing at the extrusion station is initiated.

9. In the method that is defined in claim 6, wherein the steps of closing said orifice and blowing the tubular parison includes advancing a mandrel partially into the upper end of the extruded parison, and said steps include retracting said mandrel prior to shifting the mold horizontally across said orifice so as to reopen said orifice.

10. In the method that is defined in claim 9, wherein the step of extruding a next succeeding parison is held in abeyance until after said mold has been shifted to said second shaping station.

* * * * *